United States Patent
Inskeep et al.

(10) Patent No.: US 9,780,587 B2
(45) Date of Patent: Oct. 3, 2017

(54) DYNAMO DOCKING STATION

(71) Applicants: Mathew Inskeep, Highland Beach, FL (US); Henry Shum, Boca Raton, FL (US)

(72) Inventors: Mathew Inskeep, Highland Beach, FL (US); Henry Shum, Boca Raton, FL (US)

(*) Notice: Subject to any disclaimer, the term of this patent is extended or adjusted under 35 U.S.C. 154(b) by 75 days.

(21) Appl. No.: 14/624,900

(22) Filed: Feb. 18, 2015

(65) Prior Publication Data

US 2016/0241069 A1 Aug. 18, 2016
US 2016/0372950 A9 Dec. 22, 2016

Related U.S. Application Data

(60) Provisional application No. 61/941,015, filed on Feb. 18, 2014.

(51) Int. Cl.
*H02J 7/00* (2006.01)
*H02J 7/32* (2006.01)
*H02K 35/00* (2006.01)

(52) U.S. Cl.
CPC .......... *H02J 7/0052* (2013.01); *H02J 7/0027* (2013.01); *H02J 7/32* (2013.01); *H02K 35/00* (2013.01); *Y02B 40/90* (2013.01); *Y02E 10/38* (2013.01); *Y02T 10/7055* (2013.01)

(58) Field of Classification Search
CPC .......... H02J 7/0052; H02J 7/0027; H02J 7/32; H02K 35/00; Y02B 40/90; Y02E 10/38
See application file for complete search history.

(56) References Cited

U.S. PATENT DOCUMENTS

| | | | | |
|---|---|---|---|---|
| 6,608,399 | B2* | 8/2003 | McConnell | B60R 11/02 307/10.1 |
| 7,937,667 | B2* | 5/2011 | Kramer | B60K 35/00 715/744 |
| 8,296,142 | B2* | 10/2012 | Lloyd | H04M 1/04 704/231 |
| 8,298,036 | B2* | 10/2012 | Yu | A63H 29/22 446/175 |
| 8,780,282 | B2* | 7/2014 | Vitito | B60K 35/00 348/837 |
| 8,912,678 | B2* | 12/2014 | Nozawa | F03B 13/186 290/42 |
| 2008/0172328 | A1* | 7/2008 | Ajilian | G06Q 20/10 705/39 |
| 2009/0115367 | A1* | 5/2009 | Kidakam | H02J 7/0042 320/101 |
| 2012/0028538 | A1* | 2/2012 | Wong | H02J 7/32 446/457 |
| 2013/0206496 | A1* | 8/2013 | Hashimoto | B62D 21/12 180/291 |
| 2014/0014424 | A1* | 1/2014 | Boncodin | B60L 11/00 180/65.31 |
| 2015/0086175 | A1* | 3/2015 | Lorenzetti | H04N 9/8211 386/226 |
| 2016/0372950 | A9* | 12/2016 | Inskeep | H02J 7/0052 |

* cited by examiner

*Primary Examiner* — Michael Zarroli

(57) ABSTRACT

A self charging portable power source docking station system for use with automobiles that converts mechanical energy into electrical energy.

19 Claims, 4 Drawing Sheets

DYNAMO DOCKING STATION

This application claims the benefit and priority of U.S. Ser. No.: 61/941,015

STATEMENT REGARDING FEDERALLY SPONSORED RESEARCH

The invention was not made under government contract nor was funded grant money used to fund the research

FIELD OF INVENTION

This invention is in the field of self-charging portable power source docking station system for automobiles.

SUMMARY OF THE INVENTION

The present invention is a dynamo docking station. Specifically, the invention consists of a docking station with an integrated dynamo for power generation. The internal dynamo is a generator that will convert mechanical energy into electrical energy. The electrical energy produced by the dynamo will be used to trickle charge a portable power energy source apparatus with integrated rechargeable battery when directly coupled externally to the dynamo docking station. This invention relates to a dynamo docking station. The invention is targeted for automotive usage. This particular invention has a built-in dynamo generator, which generates electrical energy by using linear movement along its axis. Other prior art may consist of a stationary docking station to recharge portable power packs, but they are not a self-sustained systems. They are merely a bypass of energy between a vehicle and the portable power station.

BACKGROUND OF THE INVENTION

The present invention is a dynamo docking station with a built-in electrical generator herein after referred to as a dynamo. The invention is intended to be mounted inside a vehicle's cabin or truck or van, or any other type of a vehicle with motion. The preferred method of mounting will he on a flat surface. The dynamo docking station will use the motion of the vehicle in conjunction with the mass of a portable power source pack to convert mechanical energy into electrical energy. This could be best described by the law of inertia, when the vehicle is moving, the portable power and dynamo docking station are in motion (inertia). The stopping and going momentum created by the vehicle will force the mass of a portable power source to act upon the docking station displacing the platform to move the internal generator. As a result, electrical energy produced will be transferred to the portable power source.

The dynamo docking station will generate electrical energy that will maintain a portable power source fully charged during storage. The invention also includes an electrical circuit that will receive the energy from the dynamo and will distribute into the portable power source. The energy will be transferred to the portable pack by external connection means, most likely an electrical conductor.

There will be no control features provided to the user as the invention is self-sustained and no external intervention will be required.

DRAWINGS

Figure 1:
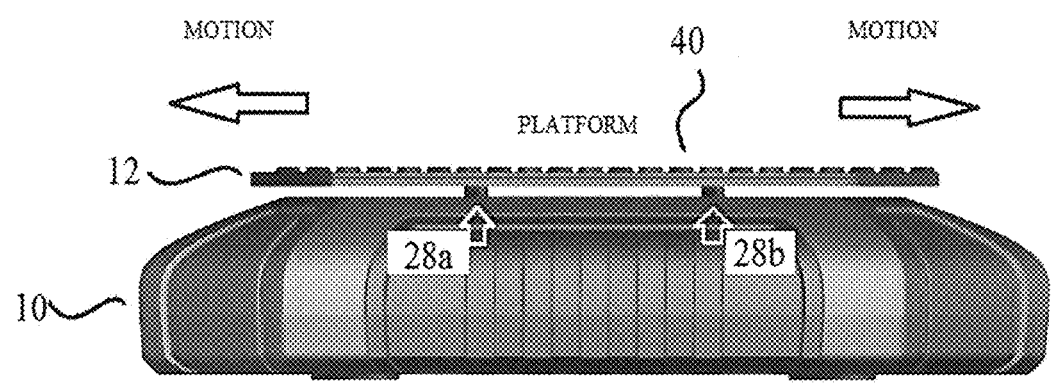
Figure 2:
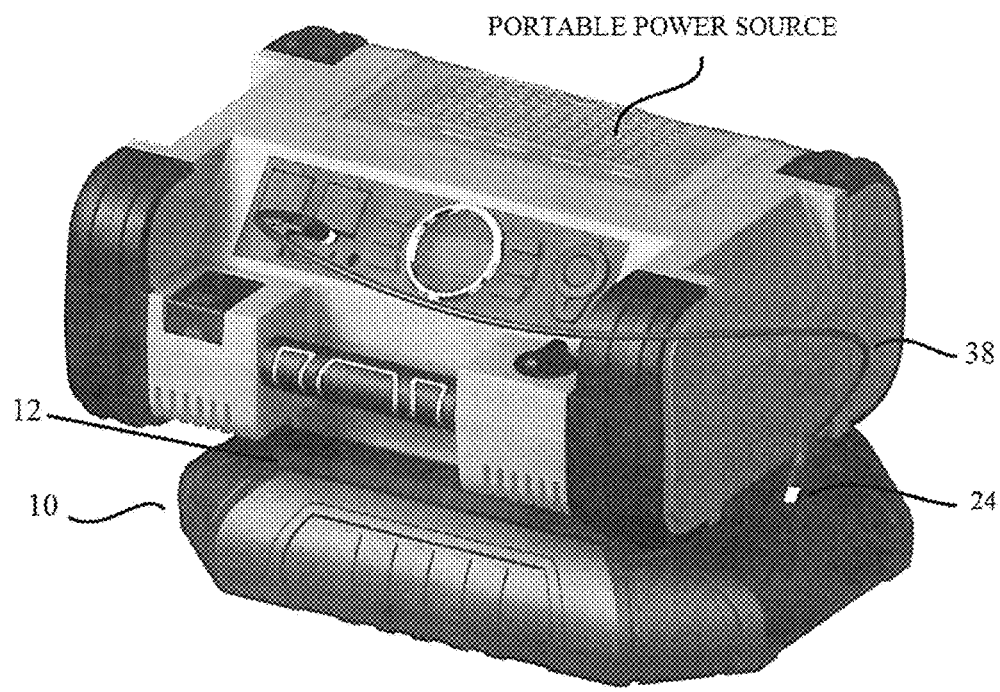
Figure 3:
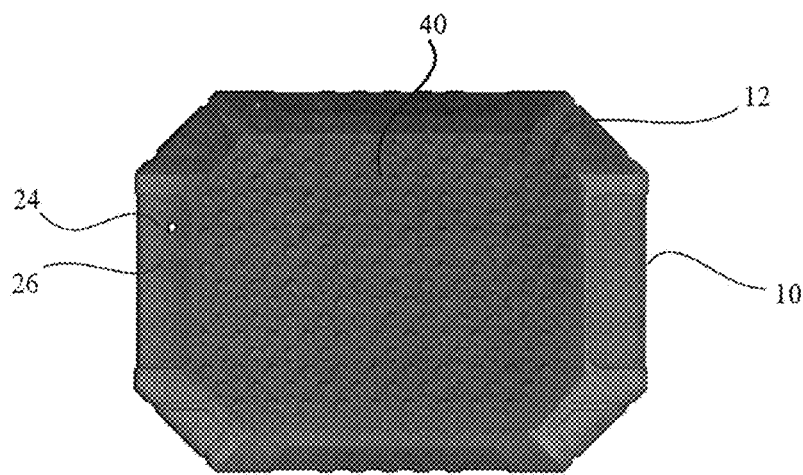
Figure 4:
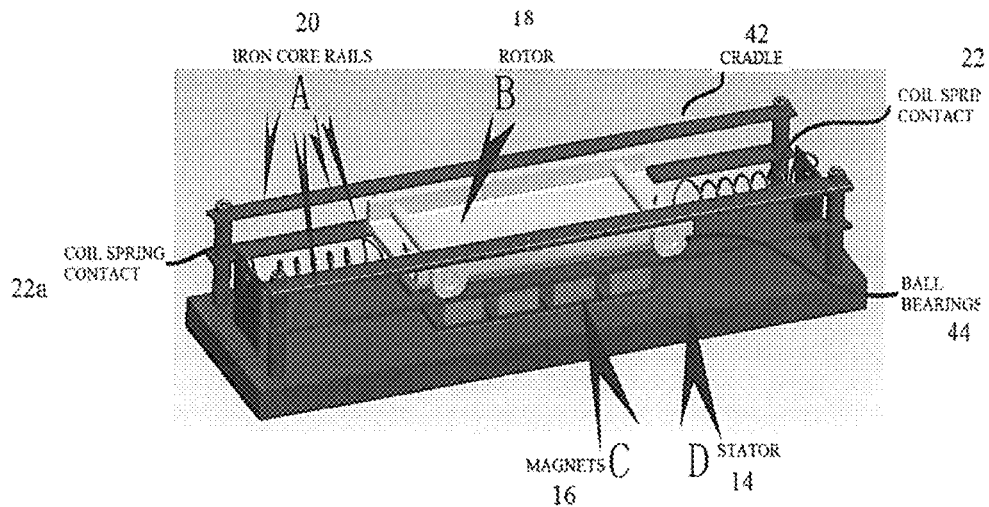
Figure 5:
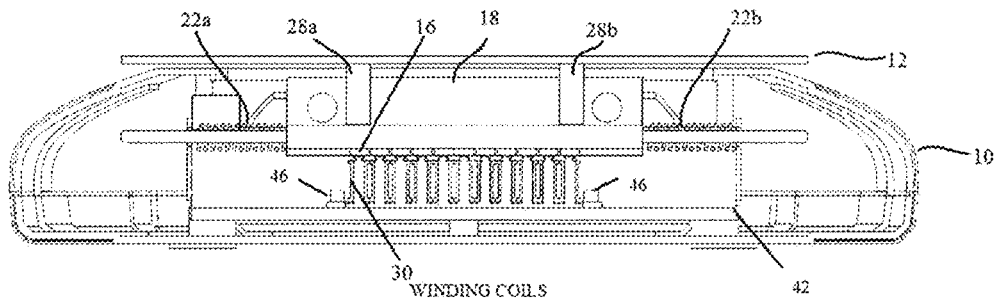
Figure 6:
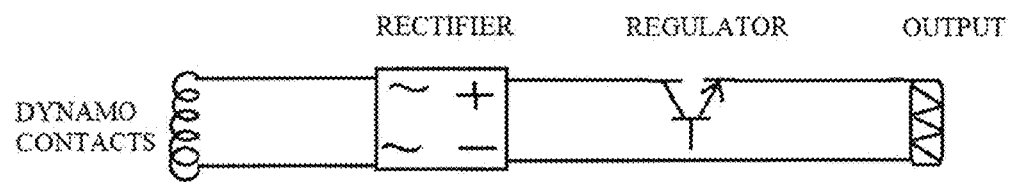

FIG. 1 is a perspective view of the present invention.
FIG. 2 is a perspective view of the present invention in a real application.
FIG. 3 is a top view of the present invention focusing on the platform.
FIG. 4 is a perspective view of the invention with the major internal components.
FIG. 5 is a view of the mechanical construction of the internal dynamo.
FIG. 6 is a block diagram of the electrical components.

DETAILED DESCRIPTION OF THE INVENTION

FIG. 1 shows a perspective view of the present invention. The main body 10 enclosure is a rectangular octagon shape. The main body 10 enclosure is of slim, wide, and compact design to allow an effective mass distribution around its center of gravity. Additional features include an elevated top surface platform 12. The platform 12 is elevated from the main body by a set of support poles 28a and 28b. These support poles are mechanically attached to the platform 12 but are not attached to the main body 10 enclosure. The platform will shift along its axis independently from the main body 10 enclosure. The support poles 28a/28b and platform 12 will shift along open channels, freely from touching the main body 10, additionally they will be supported by internal means described in detail later when the internal components are described.

The main purpose of the platform 12 is to serve as a docking station for a portable power source with internal rechargeable batteries. A view of the present invention design can be seen at FIG. 2. The entire system and intended application is captured here. The dynamo will rest on a flat surface of a vehicle's cabin, trunk or other flat surface in a vehicle. An end-user will place their rechargeable portable power source on top of the platform 12, and with the aid of a power cord 38, connect between the output receptacle 24, and the portable power source charging receptacle. The energy from the dynamo will be transferred. As previously stated, the preferred method of mounting will be on a flat surface. The dynamo docking station will be using the motion of a vehicle in conjunction with the mass of a portable power source to convert mechanical energy into electrical energy. This could be best described by a conventional dynamo generating electrical energy by the mechanical motion of its internal parts through electromagnetic induction.

FIG. 3 is a top view of the present invention where the platform 12 as well as the main body 10. Enclosure 10 is shaped as a rectangular octagon shape, but the platform 12 has a smaller surface area to that of the main body 10 enclosure. The platform 12 has on its surface an anti-slip grid 40 feature that will aid in preventing a portable power source from slipping off the platform's surface when a vehicle comes to a stop or accelerates. The output receptacle 24 and the power indicator 26 are located along the side of the main body 10. This will allow the user ease of connection access under the portable power source when using the power cord 38 described in FIG. 2.

Redirecting our focus to the internal operation of the present invention depicted in FIG. 4, here are the main components that make up the dynamo generator position inside the main body 10 enclosure described in FIG. 1. All the components in FIG. 4 give form to a fully functional electric generator that will be converting mechanical energy into electrical energy by means of mechanical force. All of these components will be confined inside a cradle 42. The cradle 42 is made up ferromagnetic metal such as iron. This material is preferred as it can increase the magnetic field and increase the effects of producing higher electric charge. The present invention will convert this energy by the linear movement of the dynamo rotor 18 being acted upon by the displacement of the platform 12 as described in FIG. 2.

The rotor 18 will displaced along the rails 20 inside the cradle's 42 axis through the use of ball bearings 44 located in a quad wheel formation on the four corners of the tray, similar to a vehicle's tires, which will facilitate a continuous perpetual motion when acted upon. In addition, the rotor will house under its tray various sets of permanent magnets 16 of opposite polarity creating a magnetic field. The rotor 18 at this point will have a linear motion that will revolve and will be couple electrically to the stator 14 through the coil contacts 22a and 22b. The stator 14 is a stationary piece of the dynamo assembled underneath the rotor 18 assembly. The rotor 18 when in motion will induce the stator 14 with a magnetic force that will cause magnetic field to break, induce the current into the coils.

In FIG. 5, a closer look to the internal construction of the dynamo components make up can be further appreciated. The stator 14 as previously mentioned is a stationary portion of the dynamo in which the winding coils 30 are formed. The dynamo winding coils 30 consist of the insulated copper wire wound around a common iron core. The winding coils 30 are wound along the stator 14 base but are insulated from the frame by the insulating supports 46. The winding coils 30 will be conducting the energy when they become energized and carry unto the coil contacts 22a and 22b. This is known as electromagnetic induction. The coils 30 of wire inside a magnetic field convert mechanical energy into a pulsating direct current through induction. The electric current will flow out of the coil spring 22a and 22b contacts directly attached to the rotor 18 creating a pulsating current of opposite phase angle that will need to be rectified and converted into a pulsating direct current. The process of rectification will be accomplished by a rectification circuit depict in FIG. 6.

Referring now to the electrical cornponentry section of the present invention, FIG. 6 shows a block diagram of the main internal components of the circuit that will receive energy generated by the dynamo and transferring to the output 24 receptacle. As the rotor 18 described in FIG. 4 moves on its axis, this action forces the coils 30 of wire to create a flow of electrons. The electrical energy generated will produce a waveform of opposite polarity and with a 180 degree phase angle. This energy will be introduced to the electrical circuit via dynamo contacts 22a and 22b. The second stage is to rectify this waveform energy into a positive pulsating direct current energy using a Wheatstone bridge circuit 32. The output of the rectifying circuit 32 will produce a positive pulsating direct current. Due to the undetermined force motion of the rotor 18 described in FIG. 4, the output amplitude cannot be determine, as it is dependent on the force from the platform 10 described in FIG. 2 that will be acting upon it. For this foregoing reason a regulator circuit 34 will be used to regulate to cap the maximum allowable voltage potential for the automotive application. Once the output charge of the dynamo goes through the rectification and regulation process, it will be output 24 through the output receptacle 26 described in FIG. 3.

All of the components described in FIG. 1 through 6 are intended to work in harmony to produce the desired outcome, which is to produce a dynamo docking station for portable power sources or similar with rechargeable battery.

What is claimed is:

1. A device for powering a portable power source in connection with movement by an object that the device is secured to, comprising:
   a main body;
   a dynamo generator disposed within the main body, the dynamo generator having a rotor, the dynamo generator capable of converting a mechanical energy input into an electrical energy output; and
   a platform having a top surface and elevated above the main body and in mechanical communication with the dynamo generator disposed within the main body;
   wherein in use the main body is adapted for securement in a fixed position to an automobile or vehicle and with a portable power source disposed on the top surface of the platform and in electrical communication with the dynamo generator; wherein movement by the automobile or vehicle causes the platform to move linear with respect to the fixed position main body which moves the rotor of the dynamo generator disposed within the main body resulting in electrical energy being produced from the converted mechanical energy and transferred to the portable power source.

2. The device of claim 1 further comprising one or more support poles secured at one end to the dynamo generator and secured at an opposite end to a bottom surface of the platform, the one or more support poles extending out of the main body to elevate the platform above the main body.

3. The device of 1 wherein the top surface of the platform is substantially planar.

4. The device of claim 1 wherein the top surface provided with an anti-slip grid member.

5. The device of claim 1 further comprising an output receptacle accessible through the main body and in electrical communication with the dynamo generator.

6. The device of claim 1 further comprising a power indicator disposed along a side of the main body.

7. The device of claim 1 wherein the dynamo generator comprising:
   a cradle disposed within the main body, the cradle having a first pair of elongated rails extending from a first end to a second end of the cradle and an opposite second pair of elongated rails extending from the first end to the second end of the cradle;
   wherein the rotor movably secured to the first pair of rails and movably secured to the second pair of rails and positioned between the first pair of rails and the second pair of rails, the rotor permitted to move along the first pair of rails and second pair of rails from the first end to the second end of the cradle;
   sets of permanent magnets of opposite polarity housed underneath the rotor, the sets of permanent magnets creating a magnetic field;
   a stator disposed electrically coupled to the rotor through coil contacts; and
   winding coils wounded along the stator, when energized the winding coils carrying the energy to the coil contacts.

8. The device of claim 7 further comprising a ball bearing disposed at or near each corner of the rotor.

9. The device of claim 7 wherein the stator is positioned underneath the rotor and remains stationary with respect to the cradle during linear movement of the rotor along the rails; wherein when the rotor is in motion from movement of the automobile or vehicle the rotor induces the stator with a magnetic force to the magnetic field to break and induce current into the winding coils.

10. The device of claim 7 wherein the winding coils comprising insulated copper wire wound around a common iron core.

11. The device of claim 7 further comprising one or more insulating supports for insulating the winding coils from the cradle.

12. The device of claim 7 wherein current flowing out of the coil contacts is a pulsating current of opposite phase angle.

13. The device of claim 12 further comprising a rectification circuit for converting the pulsating current of opposite phase angle into a pulsating direct current.

14. The device of claim 13 wherein the rectification circuit comprises a Wheatstone bridge circuit in electrical communication with the coil contacts.

15. The device of claim 13 wherein the further comprising a regulator circuit in communication with the output of the rectification circuit and in communication with an output receptacle.

16. The device of claim 7 wherein the cradle constructed from a ferromagnetic material.

17. A method for powering a portable power source from the movement of a vehicle, said method comprising the steps of:
 (a) securing a main body in a fixed position at a location within the vehicle, the main body housing a dynamo generator and having a platform elevated above the main body, the platform is in mechanical communication with the dynamo generator;
 (b) disposing a portable power source on the platform, the portable power source having a mass;
 (c) electrically connecting the portable power source to an output of the dynamo generator;
 (d) converting mechanical energy to electrical energy by the dynamo generator using motion of the vehicle in conjunction with the mass of the portable power source; and
 (e) transferring at least some of the electrical energy produced by the dynamo generator to the portable power source for powering or recharging the portable power source.

18. The method for powering of claim 17 wherein the main body having an output receptacle accessible therethrough, the output receptacle in electrical communication with the dynamo generator; wherein the step (c) comprising inserting one end of a power cord into the output receptacle and electrically securing the other end of the power cord to the portable power source.

19. The method for powering of claim 17 wherein the electrical energy is a pulsating current of opposite phase angle and prior to step (e) further comprising the step of converting the pulsating current of opposite phase angle to a pulsating direct current by a rectification circuit in communication with the dynamo generator.

* * * * *